US007555108B2

(12) United States Patent
Sylvain

(10) Patent No.: US 7,555,108 B2
(45) Date of Patent: Jun. 30, 2009

(54) PRESENCE INFORMATION FOR TELEPHONY USERS

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 171 days.

(21) Appl. No.: 10/262,393

(22) Filed: Oct. 1, 2002

(65) Prior Publication Data

US 2004/0062383 A1   Apr. 1, 2004

(51) Int. Cl.
*H04M 3/00* (2006.01)

(52) U.S. Cl. .................................. 379/207.02
(58) Field of Classification Search ............ 379/207.02, 379/207.01, 202.01, 204.01, 207.12, 106.01, 379/90.01, 210.1, 265.06, 212.01
See application file for complete search history.

(56) References Cited

U.S. PATENT DOCUMENTS

| | | | |
|---|---|---|---|
| 4,932,050 A | 6/1990 | Davidson et al. | 379/211 |
| 5,185,782 A * | 2/1993 | Srinivasan | 379/214 |
| 5,243,645 A | 9/1993 | Bissell et al. | 379/211 |
| 5,315,636 A | 5/1994 | Patel | 379/58 |
| 5,414,759 A | 5/1995 | Ishikuri et al. | 379/88 |
| 5,450,613 A | 9/1995 | Takahara et al. | 455/54.1 |
| 5,550,907 A | 8/1996 | Carlsen | 379/207 |
| 5,555,376 A | 9/1996 | Theimer et al. | 395/200.09 |
| 5,596,633 A | 1/1997 | Meier et al. | 379/201 |
| 5,633,921 A | 5/1997 | Soderberg | 379/207 |
| 5,633,924 A | 5/1997 | Kaish et al. | 379/266 |
| 5,742,905 A | 4/1998 | Pepe et al. | 455/461 |
| 5,757,901 A | 5/1998 | Hiroshige | 379/212 |
| 5,771,280 A | 6/1998 | Johnson | 379/93.23 |
| 5,790,649 A | 8/1998 | Hiroshige | 379/207 |
| 5,812,865 A | 9/1998 | Theimer et al. | 395/800 |
| 5,815,554 A | 9/1998 | Burgess et al. | 379/90.01 |
| 5,825,864 A | 10/1998 | McGraw et al. | 379/210 |

(Continued)

FOREIGN PATENT DOCUMENTS

CA   1 329 810   *   7/2003

(Continued)

OTHER PUBLICATIONS

Day, M. et al., "A Model for Presence and Instant Messaging," IETF REquest for Comments, XX, XX, No. 2778, Feb. 2000, pp. 1-17.

(Continued)

*Primary Examiner*—William J Deane
(74) *Attorney, Agent, or Firm*—Withrow & Terranova, P.L.L.C.

(57) ABSTRACT

The present invention relates to providing presence information bearing on the availability of a first user involved with a call to a second user involved with the call. In general, call information bearing on the call is received and triggers a request for presence information associated with the first user. Upon retrieval of the presence information associated with the first user, the presence information is effectively delivered to the second user in a manner informing the second user of the availability of the first user to receive a call. Thus, when an attempt to establish a call between the first and second users has failed, the second user may monitor the presence information relating to the availability of the first user to decide when, and perhaps how, to contact the first user.

42 Claims, 9 Drawing Sheets

U.S. PATENT DOCUMENTS

| | | |
|---|---|---|
| 5,930,702 A | 7/1999 | Goldman et al. ............. 455/417 |
| 5,960,173 A | 9/1999 | Tang et al. |
| 6,052,597 A | 4/2000 | Ekstrom |
| 6,058,415 A | 5/2000 | Polcyn ........................ 709/200 |
| 6,067,357 A | 5/2000 | Kishinsky et al. ............ 379/265 |
| 6,104,913 A | 8/2000 | McAllister .................... 455/41 |
| 6,125,176 A | 9/2000 | Foladare et al. ............. 379/211 |
| 6,134,314 A | 10/2000 | Dougherty et al. .......... 379/207 |
| 6,141,356 A | 10/2000 | Gorman ....................... 370/493 |
| 6,144,644 A | 11/2000 | Bajzath et al. ............... 370/259 |
| 6,148,328 A | 11/2000 | Cuomo et al. ................ 709/204 |
| 6,175,616 B1 | 1/2001 | Light et al. ............... 379/88.14 |
| 6,185,292 B1 | 2/2001 | Miloslavsky ................. 379/265 |
| 6,223,165 B1 | 4/2001 | Lauffer .......................... 705/8 |
| 6,233,465 B1 | 5/2001 | Smith et al. |
| 6,243,398 B1 | 6/2001 | Kahane et al. ............... 370/522 |
| 6,253,230 B1 | 6/2001 | Couland et al. |
| 6,260,148 B1 | 7/2001 | Aggarwal et al. ............ 713/201 |
| 6,295,348 B1 | 9/2001 | Bleile et al. .................. 379/199 |
| 6,301,609 B1 | 10/2001 | Aravamudan et al. ........ 709/207 |
| 6,330,322 B1 | 12/2001 | Foladare et al. |
| 6,377,944 B1 | 4/2002 | Busey et al. ..................... 707/3 |
| 6,389,127 B1 | 5/2002 | Vardi et al. ............. 379/209.01 |
| 6,418,198 B2 | 7/2002 | Brablec et al. ................. 379/79 |
| 6,430,289 B1 | 8/2002 | Liffick ......................... 379/900 |
| 6,445,912 B1 | 9/2002 | Cole et al. ................... 455/406 |
| 6,449,344 B1 | 9/2002 | Goldfinger et al. ........ 379/88.17 |
| 6,463,142 B1 | 10/2002 | Kilp ....................... 379/201.06 |
| 6,463,471 B1 | 10/2002 | Dreke et al. ................. 709/224 |
| 6,480,593 B1 | 11/2002 | Munday et al. ......... 379/211.02 |
| 6,483,900 B1 | 11/2002 | Light et al. ............... 379/88.17 |
| 6,519,639 B1 | 2/2003 | Glasser et al. ............... 709/224 |
| 6,546,096 B1 | 4/2003 | Meiden et al. .......... 379/209.01 |
| 6,549,937 B1 * | 4/2003 | Auerbach et al. ............ 709/206 |
| 6,560,648 B1 | 5/2003 | Dunn et al. .................. 709/224 |
| 6,564,261 B1 | 5/2003 | Gudjonsson et al. ........ 709/227 |
| 6,584,494 B1 | 6/2003 | Mannabe et al. ............ 709/204 |
| 6,617,969 B2 | 9/2003 | Tu et al. |
| 6,618,710 B1 | 9/2003 | Zondervan et al. |
| 6,633,636 B1 | 10/2003 | McConnell et al. |
| 6,640,241 B1 | 10/2003 | Ozzie et al. |
| 6,654,790 B2 | 11/2003 | Ogle et al. |
| 6,658,095 B1 | 12/2003 | Yoakum et al. ........... 379/93.01 |
| 6,665,395 B1 | 12/2003 | Busey et al. ............ 379/265.09 |
| 6,678,719 B1 | 1/2004 | Stimmel |
| 6,697,840 B1 | 2/2004 | Godefroid et al. ........... 709/205 |
| 6,700,966 B2 | 3/2004 | Takagi et al. ............ 379/201.16 |
| 6,728,754 B1 | 4/2004 | Lipton |
| 6,735,701 B1 | 5/2004 | Jacobson .................... 713/201 |
| 6,738,461 B2 * | 5/2004 | Trandal et al. .......... 379/142.02 |
| 6,741,853 B1 | 5/2004 | Jiang et al. |
| 6,799,209 B1 | 9/2004 | Hayton |
| 6,807,423 B1 | 10/2004 | Armstrong et al. ........... 455/440 |
| 6,810,411 B1 | 10/2004 | Coughlin et al. ............. 709/203 |
| 6,920,498 B1 | 7/2005 | Gourlay et al. |
| 6,985,961 B1 | 1/2006 | Ramsayer et al. |
| 7,020,480 B2 | 3/2006 | Coskun et al. |
| 7,103,651 B2 | 9/2006 | Bohannon et al. |
| 7,136,631 B1 | 11/2006 | Jiang et al. |
| 2001/0005412 A1 * | 6/2001 | Light et al. |
| 2001/0039585 A1 | 11/2001 | Primak et al. ................ 709/228 |
| 2001/0044299 A1 | 11/2001 | Sandegren ................... 455/422 |
| 2001/0053213 A1 | 12/2001 | Truong et al. ........... 379/202.01 |
| 2001/0053214 A1 * | 12/2001 | Kleinoder et al. |
| 2002/0006803 A1 | 1/2002 | Mendiola et al. ............ 455/466 |
| 2002/0024947 A1 | 2/2002 | Luzzatti et al. .............. 370/352 |
| 2002/0032035 A1 | 3/2002 | Teshima |
| 2002/0035605 A1 | 3/2002 | McDowell et al. .......... 709/206 |
| 2002/0038360 A1 | 3/2002 | Andrews et al. ............. 709/223 |
| 2002/0049842 A1 | 4/2002 | Huetsch et al. |
| 2002/0055975 A1 | 5/2002 | Petrovykh ................... 709/205 |
| 2002/0059622 A1 | 5/2002 | Grove et al. ................... 725/91 |
| 2002/0060988 A1 | 5/2002 | Shtivelman ................. 370/259 |
| 2002/0065894 A1 | 5/2002 | Dalal et al. .................. 709/206 |
| 2002/0076010 A1 | 6/2002 | Sahai ....................... 379/88.19 |
| 2002/0078188 A1 | 6/2002 | Anand et al. ................ 709/222 |
| 2002/0101993 A1 | 8/2002 | Eskin .......................... 380/270 |
| 2002/0102993 A1 | 8/2002 | Hendrey et al. |
| 2002/0111173 A1 | 8/2002 | Hendrey et al. |
| 2002/0114432 A1 | 8/2002 | Shaffer et al. ............. 379/90.01 |
| 2002/0116336 A1 | 8/2002 | Diacakis et al. ............... 705/51 |
| 2002/0116461 A1 | 8/2002 | Diacakis et al. ............. 709/204 |
| 2002/0120687 A1 | 8/2002 | Diacakis et al. ............. 709/204 |
| 2002/0126701 A1 | 9/2002 | Requena ..................... 370/469 |
| 2002/0131395 A1 | 9/2002 | Wang |
| 2002/0143876 A1 | 10/2002 | Boyer et al. ................. 709/205 |
| 2002/0143877 A1 | 10/2002 | Hackbarth et al. ........... 709/205 |
| 2002/0147008 A1 | 10/2002 | Kallio ......................... 455/426 |
| 2002/0147777 A1 * | 10/2002 | Hackbarth et al. |
| 2002/0147814 A1 | 10/2002 | Kimchi et al. ............... 709/226 |
| 2002/0163572 A1 * | 11/2002 | Center, Jr. et al. |
| 2002/0165000 A1 | 11/2002 | Fok |
| 2002/0181693 A1 | 12/2002 | Ribera .................... 379/265.09 |
| 2002/0194335 A1 | 12/2002 | Maynard ..................... 709/225 |
| 2002/0196770 A1 | 12/2002 | Lin ............................. 370/349 |
| 2003/0004762 A1 | 1/2003 | Banerjee et al. ................. 705/5 |
| 2003/0018704 A1 | 1/2003 | Polychronidis et al. ...... 709/202 |
| 2003/0023623 A1 | 1/2003 | Horvitz et al. |
| 2003/0023681 A1 | 1/2003 | Brown et al. ................ 709/204 |
| 2003/0026289 A1 * | 2/2003 | Mukherjee et al. |
| 2003/0028621 A1 | 2/2003 | Furlong et al. |
| 2003/0035529 A1 | 2/2003 | Baker ..................... 379/211.02 |
| 2003/0037103 A1 * | 2/2003 | Salmi et al. |
| 2003/0037113 A1 * | 2/2003 | Petrovykh |
| 2003/0041101 A1 | 2/2003 | Hansche et al. ............. 709/203 |
| 2003/0048195 A1 * | 3/2003 | Trosseen |
| 2003/0052915 A1 | 3/2003 | Brown et al. ................ 345/752 |
| 2003/0055897 A1 | 3/2003 | Brown et al. ................ 709/205 |
| 2003/0059029 A1 | 3/2003 | Mengshoel et al. ..... 379/265.02 |
| 2003/0065721 A1 * | 4/2003 | Roskind |
| 2003/0065788 A1 * | 4/2003 | Salomaki |
| 2003/0069934 A1 | 4/2003 | Garcia-Martin et al. |
| 2003/0073440 A1 * | 4/2003 | Mukherjee et al. |
| 2003/0078979 A1 | 4/2003 | Sagi |
| 2003/0093482 A1 | 5/2003 | Watanabe et al. ............ 709/206 |
| 2003/0101278 A1 | 5/2003 | Garcia-Luna-Aceves et al. ................ 709/240 |
| 2003/0104819 A1 | 6/2003 | Knauerhase et al. |
| 2003/0105820 A1 * | 6/2003 | Haims et al. |
| 2003/0129972 A1 | 7/2003 | Tosaki et al. |
| 2003/0135624 A1 * | 7/2003 | McKinnon et al. |
| 2003/0174814 A1 * | 9/2003 | Diacakis |
| 2003/0206619 A1 * | 11/2003 | Curbow et al. |
| 2003/0217099 A1 | 11/2003 | Bobde et al. |
| 2003/0217142 A1 | 11/2003 | Bobde et al. |
| 2003/0225848 A1 | 12/2003 | Heikes et al. |
| 2003/0229722 A1 | 12/2003 | Beyda |
| 2003/0233537 A1 | 12/2003 | Wohlgemuth et al. |
| 2003/0235287 A1 * | 12/2003 | Margolis |
| 2004/0037271 A1 * | 2/2004 | Liscano et al. |
| 2004/0044647 A1 * | 3/2004 | Salmenkaita |
| 2004/0059781 A1 | 3/2004 | Yoakum et al. |
| 2004/0073614 A1 * | 4/2004 | Blohm ........................ 709/206 |
| 2004/0122810 A1 | 6/2004 | Mayer ........................... 707/3 |
| 2004/0122901 A1 | 6/2004 | Sylvain |
| 2004/0125941 A1 | 7/2004 | Yoakum |
| 2004/0153506 A1 * | 8/2004 | Ito et al. |
| 2004/0172528 A1 | 9/2004 | Tenereillo |
| 2004/0174966 A1 * | 9/2004 | Koch |
| 2004/0177278 A1 | 9/2004 | Lipton |
| 2004/0203746 A1 | 10/2004 | Knauerhase et al. |
| 2004/0203927 A1 | 10/2004 | Kraft |
| 2004/0249776 A1 | 12/2004 | Horvitz et al. ................ 706/21 |
| 2005/0041580 A1 * | 2/2005 | Petrovykh ................... 370/229 |

| | | | |
|---|---|---|---|
| 2005/0044144 | A1 | 2/2005 | Malik et al. |
| 2005/0074101 | A1* | 4/2005 | Moore et al. |
| 2005/0086211 | A1 | 4/2005 | Mayer |
| 2005/0117570 | A1* | 6/2005 | Cetusic et al. |
| 2005/0172011 | A1 | 8/2005 | Gourlay et al. |

FOREIGN PATENT DOCUMENTS

| | | |
|---|---|---|
| EP | 1071295 A2 | 1/2001 |
| EP | 1 148 688 A1 | 10/2001 |
| EP | 1 225 752 A2 | 7/2002 |
| EP | 1 329 810 A1 | 7/2003 |
| WO | 99/17194 | 4/1999 |
| WO | WO 99/34628 | 7/1999 |

OTHER PUBLICATIONS

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for PCT/IB03/06073, mailed May 4, 2004.

Day, M. and Rosenberg, J., "Request for Comments (RFC) 2778: A Model for Presence and Instant Messaging," IETF—Network Working Group, Information Memo, Feb., 2000, XP002201444.

Rosenberg, J. and Schulzrinne, H., "draft-rosenberg-sip-pip.00.txt: SIP for Presence," IETF Internet Draft, Nov. 13, 1998, pp. 1-22, XP002325320.

European Search Report for 03257957.5, mailed Aug. 24, 2005.

International Search Report for PCT/IB02/05523 mailed Apr. 15, 2003.

International Search Report for PCT/IB03/03994 mailed Mar. 30, 2004.

International Search Report for related application PCT/US02/40882, mailed Oct. 8, 2003.

PCT International Search Report for PCT/IB03/04250, mailed Jan. 19, 2004.

PCT International Search Report for PCT/IB03/03962, mailed Jan. 28, 2004.

Eschenburg, Axel, "Wo Laufen Sie Denn? ICQ Haelt Verbindung Zu Bekannten," CT Magazin Fuer Computer Technik, Verlag Heinz Heise GMBH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

Brodsky, Alexander et al., "Resource Management in Agent-based Distributed Environments," Proceedings of the 1999 International Symposium on Kyoto, Japan Nov. 28-30, 1999, pp. 95-108, XP010379697.

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Krauter, Klaus, et al., "A Taxonomy and Survey of Grid Resource Management Systems for Distributed Computing," Software Practice & Experience, John Wiley & Sons Ltd., Chichester, Great Britain, vol. 32, No. 2, Feb. 2, 2002, pp. 135-164, XP001091827.

International Search Report for PCT/IB03/05780 mailed Jan. 27, 2005.

* cited by examiner

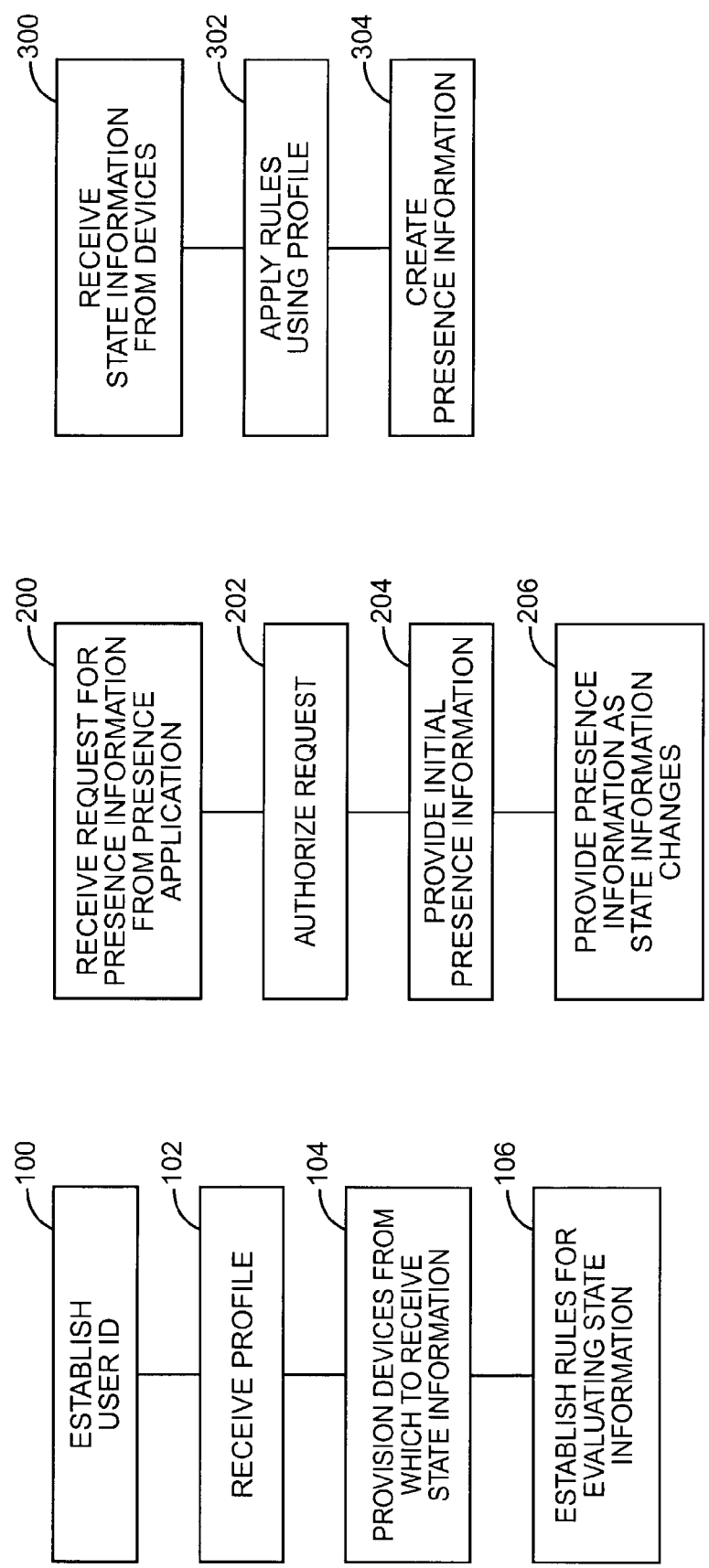

PRESENCE INFORMATION FOR TELEPHONY USERS

FIELD OF THE INVENTION

The present invention relates to communications, and in particular to providing presence information bearing on the availability of a one party to another party.

BACKGROUND OF THE INVENTION

Since the onset of voicemail, people have experienced the phenomenon of "telephone tag" wherein a called party is met with a busy signal or forced into voicemail upon trying to return a call. As is often the case, the called party will leave the original caller a telephone message, and when the original caller tries to return the returned call, the original called party is either on the telephone or no longer available to talk. These iterative and futile attempts to establish voice communications are often time-consuming and frustrating. Thus, there is a need to allow parties to determine the availability of another party and determine when to place a call based on such availability.

SUMMARY OF THE INVENTION

The present invention relates to providing presence information bearing on the availability of a first user involved with a call to a second user involved with the call. The call may be an attempted or completed incoming or outgoing call with respect to the second user. In general, call information bearing on the call is received and triggers a request for presence information associated with the first user. Upon retrieval of the presence information associated with the first user, the presence information is effectively delivered to the second user in a manner informing the second user of the availability of the first user to receive a call. Thus, after a call is completed or when an attempt to establish a call between the first and second users has failed, the second user may monitor the presence information relating to the availability of the first user to decide when, and perhaps how, to contact the first user. Accordingly, the present invention is effective in minimizing "telephone tag" by allowing telephony users to monitor the availability of other telephony users.

In one embodiment, the second user is associated with a telephony device and a computing device, which are related to one another. When an incoming or outgoing call involving the first user is detected, presence information for the first party is requested, and upon receipt, is forwarded to the computer device, which will alert the second user of the availability of the first user to receive a call. Preferably, the presence information bears on whether the first user is actively participating in another call using a telephony device associated with the previous call attempt. The presence information may also be a function of state information derived from other devices associated with the first user. When the first user stops using her telephony device, presence information is provided to the second user to indicate that the first user is now available to receive a call via the first user's telephony device. The telephony device and computing device of the second user may be separate, or integrated to various degrees. Importantly, users of a telephony system may receive presence information bearing on the availability of participants in previous calls.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 is a flow diagram outlining a provisioning process according to one embodiment of the present invention.

FIG. 4 is a flow diagram outlining overall operation of a presence system according to one embodiment of the present invention.

FIG. 5 is a flow diagram outlining the processing of state information according to one embodiment of the present invention.

DETAILED DESCRIPTION OF THE PREFERRED EMBODIMENTS

Figure 1:
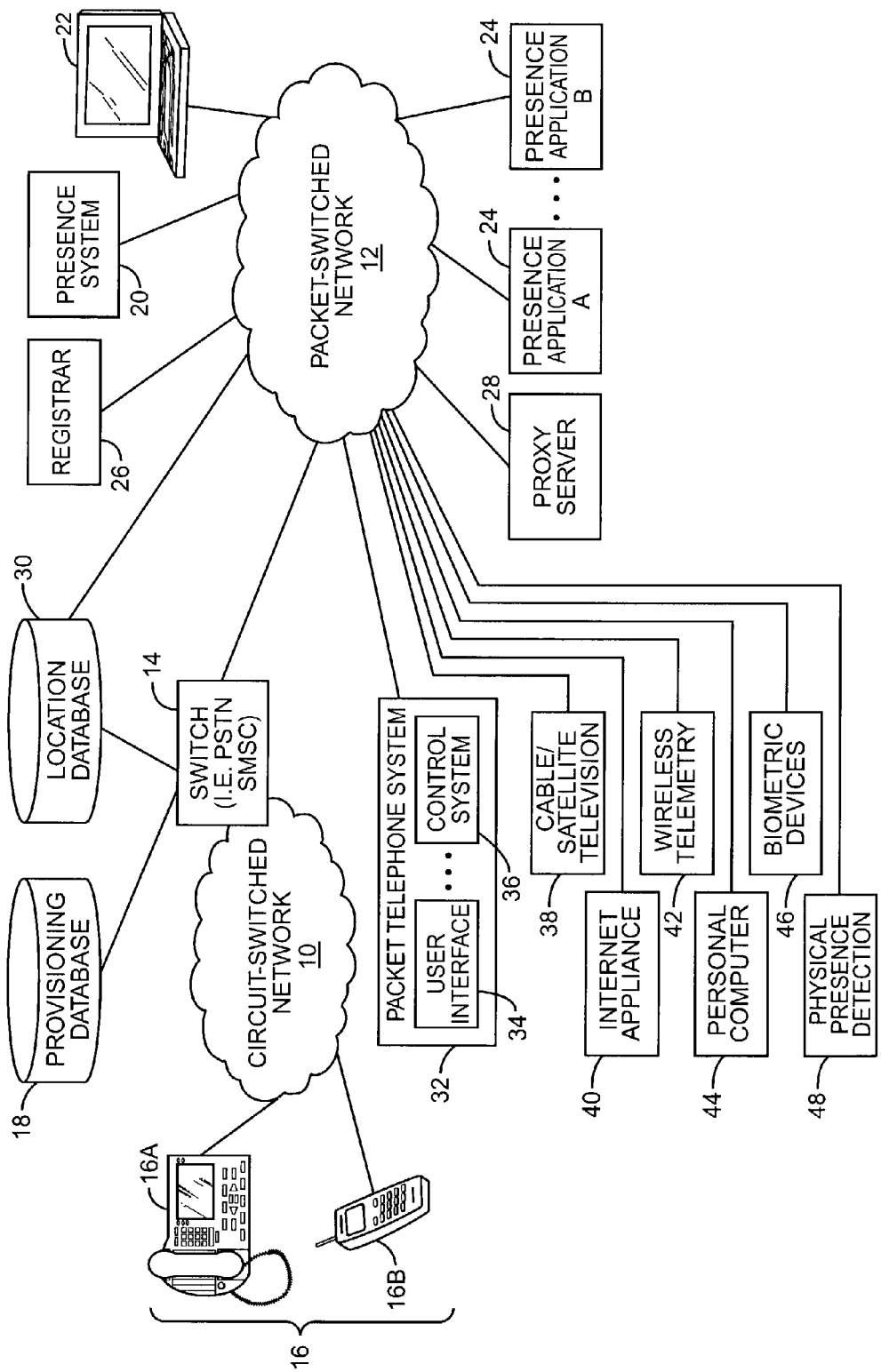
FIG. 1 is a block representation of a communication environment constructed according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a telephony user information bearing on the availability of other users. The other users are typically previous callers or parties the telephony user has attempted to call. The availability information is automatically provided to the telephony user and allows the telephony user to initiate communications to a party at a time when the party is available. In general, the present invention is able to allow a telephony user to subscribe to a service providing availability information for a party who has attempted to call the telephony user or a party whom the telephony user has attempted to call or intends to call. Based on the availability information, the telephony user can make informed decisions as to when to initiate communications with the party. Notably, the availability information is provided in presence information derived from a presence system, which is preferably capable of deriving information bearing on a party's availability based on the party's interaction with a telephony system. Accordingly, the following disclosure describes an exemplary presence system prior to delving into the structural and functional details of the present invention.

As noted, presence technology is used to convey information about the availability of individuals. Individuals are often interested in the availability of others and, because they are often not co-located, they require mechanisms for conveying availability or status information. The devices that people interact with know bits and pieces about how available they are for communications or other forms of interaction with others at any instant. People who are on the phone are less available to most others for the duration of the call, but may want to be interrupted by selected callers.

The location of a person on a mobile phone is information that may be relevant for determining whether that person is available for a certain type of event. For example, someone traveling far away from home may not be available for physical interaction with their neighbors, but may be available to take a call. Similarly, someone near a particular restaurant at lunchtime is a potential consumer.

Presence related information is routinely generated in many devices connected to various networks. For example, a person using a Personal Computer (PC) attached to a network may generate various presence state information. An "On-line" state indicates a user has logged onto a network, such as the Internet or a corporate intranet, while an "Off-line" state indicates no connection is currently active between the user and the presence engine. "Idle" status implies the user's system, although logged on, has not been active recently. Similarly, a person who acknowledges a calendar event in a PC or personal digital assistant (PDA) essentially signals their limited availability to most others for some duration while at the same time indicates that the person is active on that device.

With reference to FIG. 1, a communication environment that is capable of automatically generating presence information from a plurality of sources is illustrated. The communication environment may include a circuit-switched network 10, such as the public switched telephone network (PSTN) or a cellular communication network, and a packet-switched network 12, such as the Internet, which supports packet-switched communications. The circuit-switched network 10 may include various types of switches 14 to facilitate circuit-switched communications for landline or wireless communications. The circuit-switched network 10 supports communications with various types of telephony devices 16, such as a traditional landline telephone 16A or a mobile telephone 16B. In a wireless communication embodiment, the switches 14 cooperate with base stations (not shown), which facilitate wireless communications with mobile terminals, such as the mobile telephone 16B. Those skilled in the art will recognize the functionality of the switches 14 and other components in the circuit-switched network 10 to facilitate communications with the landline and wireless telephony devices 16.

The switch 14 is defined as being either an integrated device or multi-component system facilitating circuit-switched communication and including call server or call control functionality, which is traditionally provided in intelligent networks (IN), such as those implementing SS7 and the like. Typically, the switches 14 cooperate with a provisioning database 18, which provides information allowing a switch 14 to properly identify, locate, and provision the various telephony devices 16 in the circuit-switched network 10.

A presence system 20 located on the packet-switched network 12 is used to deliver state information, which is derived from user interaction with any number of sources. For example, the switch 14 may be configured to provide the state of the telephony device 16, its location, or a combination thereof, directly or indirectly to the presence system 20.

The presence system 20 may be configured by a user device, such as a PC 22, and operates to collect state information for various devices of various users, process the state information to derive presence information, and provide the presence information to presence applications 24, automatically or in response to a request. Each presence application 24 directly or indirectly provides alerts to the associated user based on presence information associated with other users and derived from the presence system 20. Preferably, the presence application 24 subscribes to the presence system 20 and identifies the users whose presence information is desired. The presence system 20 will accept these subscriptions as well as register participating users and their associated devices. The presence system 20 may also implement various presence delivery rules to allow users to control the dissemination of their presence information to subscribers. Notably, various profiles may be established to allow select groups of subscribers to obtain more presence information than other groups. Accordingly, each registered user may implement filters or rules to control dissemination of their information to subscribers. In the converse, subscribers electing to receive the presence information of others may also establish profiles identifying the users whose presence information is desired and the types of presence information they wish to receive.

A registrar 26 may be provided on the packet-switched network 12 to maintain a relationship between the logical and the physical addresses of devices that directly or indirectly communicate with the presence system 20. Such registration is typically required only when there is a change between the logical or user addresses and the physical addresses of a given device.

In one embodiment, the switch 14 is configured to provide state information corresponding to the status, mode, location, or a combination thereof associated with a telephony device 16 to the presence system 20. A proxy server 28 may be provided to act as a liaison between the switch 14 and the presence system 20. As such, the switch 14 will provide presence information to the proxy server 28, which will represent the switch 14 to the presence system 20 in traditional proxy fashion. Those skilled in the art will recognize that the proxy server 28 is optional and may prove beneficial with certain communication protocols.

The presence information provided to the presence system 20 from the switch 14 will depend on the application and the type of communication environment. For example, the traditional landline telephone 16A will not change location, and will typically provide location information only as a part of registration, and will dynamically provide a mechanism to determine state information relating to its operation. The switch 14 that serves the telephone 16A can determine whether the phone is on-hook or off-hook, and thus determine whether the user is engaged in a telephone call. More sophisticated systems may be able to determine whether the party is on a conference call, on hold, and whether any settings on the phone indicate that the user is in or out of the office. Accordingly, the state information gathered by the switch 14 in association with the operation of telephone 16A is used to create presence information to send to the presence system 20 via the proxy server 28.

For mobile terminals, such as the mobile telephone 16B, the servicing mobility switching center (SMSC), which is represented by the switch 14, may gather all of the state information described above, as well as provide dynamic location information derived directly from the mobile terminal 16B or from the circuit-switched network 10. Accordingly, the state information for mobile devices may be supplemented with location information, which provides the presence system 20 the opportunity to distribute presence information to the various presence applications 24 based on dynamic location, if so desired. The location information may be provided by the mobile terminal 16B, if equipped with location detection technology, such as that provided by the Global Positioning System (GPS), wherein the mobile terminal 16B receives the GPS coordinates and may provide either the coordinates to the switch 14, which will determine the mobile terminal's location, or may process the GPS information to determine a location, which is then sent to the switch 14. Alternatively, triangulation techniques may be used to determine the mobile terminal's location, which may be stored in a location database 30 or like device. The location database 30 may be accessed via the switch 14 to obtain location information, or the location database 30 may be configured such that the presence system 20 or an associated device may directly access it via the packet-switched network 12.

Packet-based telephony devices, such as packet telephone system 32, essentially emulate the operation of circuit-switched telephony devices 16 entirely over the packet-switched network 12. Thus, state information associated with a fixed or mobile packet telephone system 32 may be configured to automatically provide state information, and perhaps location information, to the presence system 20 directly or indirectly via a proxy server 28. The packet telephone system 32 will include a user interface 34 and a control system 36. As those skilled in the art will recognize, the packet telephone system 32 may be integrated into a single device, or may be implemented in multiple devices in a client-server configuration. For the latter case, the proxy server 28 may be further configured to support various operational features of the packet telephone system 32.

The user interface 34 may include a microphone and speaker to facilitate voice communications, as well as various keypads and displays to allow user interaction in traditional fashion. The control system 36 will operate to support the user interface 34 and provide the requisite functionality to enable the packet telephone system 32 to facilitate communications with other devices on the packet-switched network 12 directly or indirectly via the proxy server 28. For the purposes of description, assume that the control system 36 is capable of gathering and providing state information for the packet telephone system 32. In wireless environments, a wireless packet-switched network (not shown) is necessary to facilitate communications with the packet-switched network 12.

In addition to the telephony-based updates, an unlimited number of devices or systems with which users directly or indirectly interact may be modified to automatically provide state information. The devices and systems may include cable or satellite television systems 38, internet appliances 40, wireless telemetry devices 42, PCs 44, biometric devices 46, physical presence detection systems 48, and the like. For example, set-top boxes or receivers of cable or satellite systems 38 may be configured to provide state updates to a central location, which forwards the updates to the presence service 20 in association with the user. These devices are normally on disparate networks and configured to communicate various types of information, such as billing information, to a central location. Preferably, a server at the central location will facilitate delivery of state information to the presence system 20. The server may be configured to monitor the respective devices to determine state changes, or may simply receive state changes generated by the devices. With the proliferation of broadband Internet connectivity, particularly in cable networks, devices of this type could also be directly attached to the packet switched network 12 and provide state updates directly to the presence system 20. Similarly, internet appliances 40, such as refrigerators, dishwashers, alarm systems and the like, can readily be configured to send state information relating to user interaction directly or indirectly to the presence system 20.

Wireless telemetry devices 42 may monitor a user's interaction or location associated with a person or vehicle and provide state information to the presence system 20. Similarly, biometric devices 46, which monitor or check biometric data of the user, and physical presence detection systems 48, which monitor physical presence, may provide state information to the presence system 20. Any of the devices and systems may be connected directly or indirectly, via a gateway or the like, to the Internet. Further, entertainment systems, such as home theater systems, gaming consoles, televisions, and the like can sense user activity and provide state updates to the presence system 20.

Figure 2:
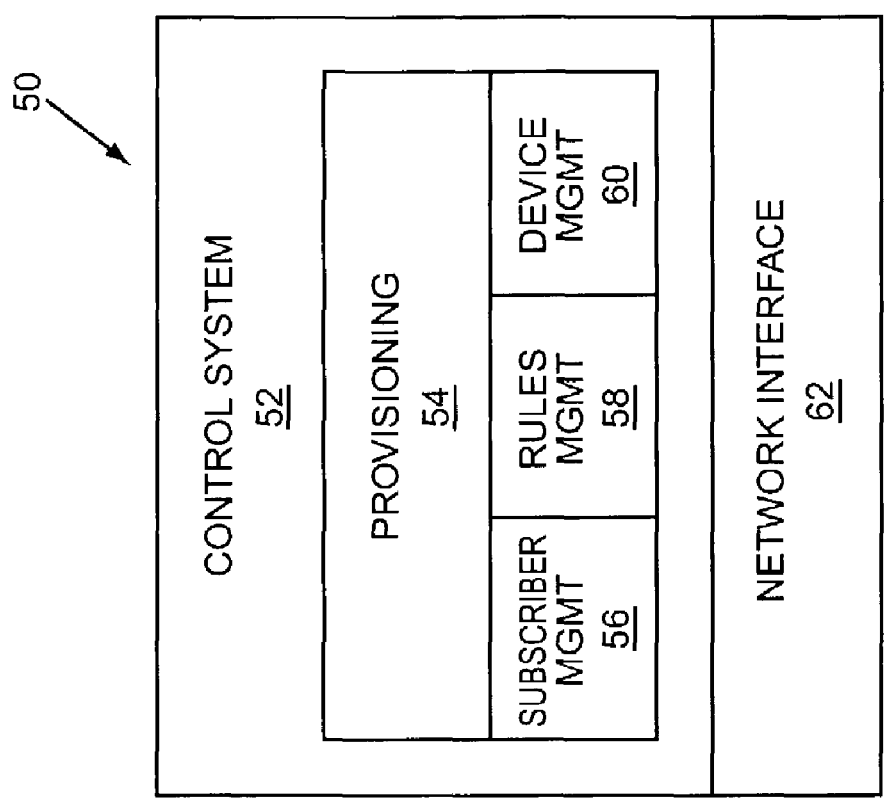
FIG. 2 is a logical representation of a presence system according to one embodiment of the present invention.

With reference to FIG. 2, the presence system 20 may be implemented in one or more cooperating presence servers 50. A logical breakdown of one embodiment of the presence server 50 is illustrated. A presence server 50 may include a control system 52 adapted to implement provisioning logic 54, subscriber management logic 56, rules management logic 58, and device management logic 60. The device management logic 60 facilitates and controls interaction with the various devices, which are configured to provide state information to the presence server 50 based on user interaction. The subscriber management logic 56 facilitates and controls interaction with the presence applications 24 associated with subscribers.

Accordingly, the presence applications 24 will subscribe to the presence server 50 to receive status updates for one or more users via the subscriber management logic 56. Based on the subscription, the presence server 50 will receive state information from the various devices, evaluate the state information to generate presence information using rules in the rules management logic 58, and deliver the presence information to the subscribing presence application 24. The device management logic 60 will control interaction with the various devices providing state information. Such control may include configuring the device to provide the state information in a specified manner and format. The provisioning logic 54 facilitates provisioning of the subscriber management logic 56, rules management logic 58, and device management logic 60. Provisioning may include establishing a profile for the user providing presence information. The profile will typically identify devices and their respective states to monitor, provide rules for evaluating the state information to generate the presence information, and identify individuals, systems, or applications authorized to receive the information. The control system 52 is also associated with a network interface 62 for facilitating communications over the packet-switched network 12.

An exemplary process for initializing the presence system 20 to disseminate user information is outlined in FIG. 3. Initially, the user must establish an identification for the presence service provided by the presence system 20 (step 100). The presence service will then receive a profile for the user (step 102). Based on the profile, the presence service is provisioned to receive state information from the devices (sources) (step 104). Preferably, the device management logic 60 is configured to receive the state information from the provisioned devices. To configure the devices, users may have to interact directly with the devices themselves, or some server or switch to which they are attached, in order to configure the devices to start sending status information to a certain entity associated with the presence system 20 or directly to the presence system 20. An exemplary model may actually be for the devices to subscribe to supply information on behalf of a user, who will authorize the devices to provide the status information. Next, the rules for evaluating the state information are established based on the profile (step 106). At this point, the rules management logic 58 and device management logic 60 are configured for a given user. The rules typically define how to evaluate the state information and deliver the resultant presence information. A user may use the profile to establish rules to control how they should be contacted based on the state of one or more associated devices.

Those skilled in the art will recognize limitless variations in profile and rule constructions for evaluating state information and generating presence information to send to subscribing presence applications. Further, any combination of current and past device state information may be used to determine the presence information. Preferably, the presence information is automatically updated, if necessary, when state changes are detected. Depending on the presence rules, a state change from a given device may or may not impact the presence information. If the presence information does not change, then there may not be a need to update the subscribing presence applications 24.

FIG. 4 provides an exemplary process for subscribing to presence updates for a user through the presence service. Initially, a subscriber, via a presence application 24, will send a request to subscribe to the presence service. The subscription management logic 56 will receive the request for presence information from the presence application 24 (step 200). The presence service will authorize the request (step 202), and, if authorized, provide initial presence information to the subscribing presence application 24 (step 204). The initial presence information may be default presence information or that based on current states of the devices as evaluated by the rules. Once subscribed, the presence service will provide presence information to the presence application 24 as state information from the devices changes in a manner warranting a presence update (step 206).

FIG. 5 illustrates an exemplary process for evaluating state information from the provisioned devices. The process continuously receives state information from all provisioned devices (step 300) and applies the rules for the user based on the user profile (step 302). Notably, the presence application 24 or subscriber associated therewith can also provide a profile to configure or otherwise filter the types of presence information requested. Finally, the rules management logic 58 will evaluate the state changes and create presence information, if necessary, to send to the subscribing presence application 24 (step 304).

Accordingly, the present invention automatically receives state information from interactions with devices and evaluates the state information by a rules-based presence system that takes into account relatively static preferences supplied directly by the user wishing to project an indication of presence along with optional positional data associated with the devices. Those skilled in the art will recognize that manually provided state information may be used by the rules management logic 58 in combination with those initiated from naturally occurring interactions.

Although many communication protocols may be used to facilitate communications, including delivery of state and presence information between the various devices, the Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 3261: Session Initiation Protocol, which is incorporated herein by reference in its entirety.

In general, a SIP proxy, such as may be provided by the proxy server 28, may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the switch 14, the registrar 26, the presence system 20, the device running the presence application 24, and the like.

A SIP endpoint is generally capable of running an application, which is generally referred to as a user agent (UA), and is capable of facilitating media sessions using SIP. User agents register their ability to establish sessions with a SIP proxy, such as proxy server 28, by sending REGISTER messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions.

A SUBSCRIBE message may be used to subscribe to an application or service provided by a SIP endpoint. Further, NOTIFY messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

The following example illustrates detailed message flows related to telephony devices, which are in one particular class of devices that can provide state information. Other classes of devices, including but not limited to those previously discussed, may have their own unique message flows to achieve similar results. Those skilled in the art will recognize there are many implementation methods possible for associating devices with the presence system 20. This SIP-based example provides a relatively simplified explanation of relevant message flows.

Figure 6:
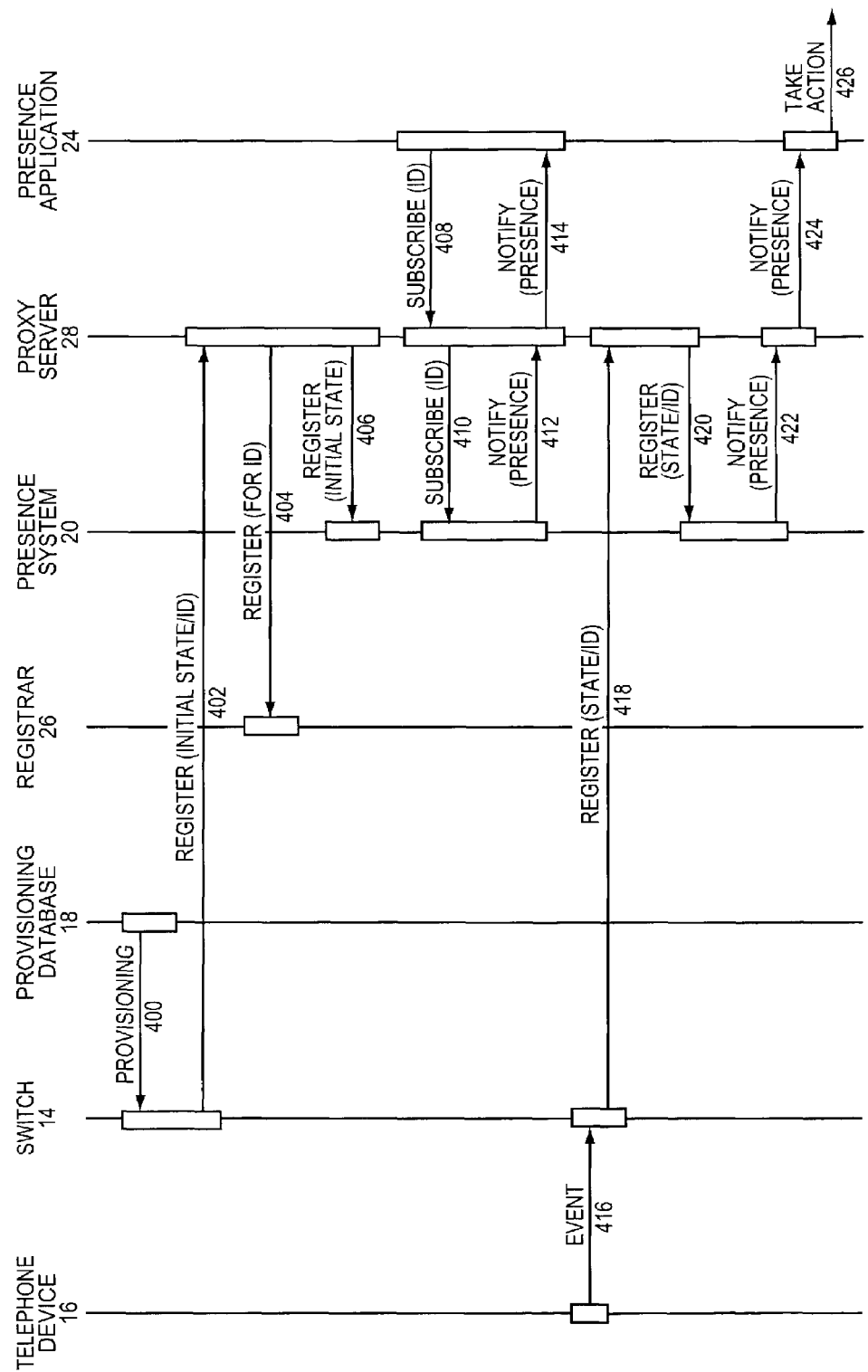
FIG. 6 is a communication flow outlining an exemplary process for automatically providing state information from a telephony system.

An exemplary message flow for providing state information relating to a telephony device 16 on the circuit-switched network 10 is illustrated in FIG. 6. Although the SIP protocol is used for illustration, those skilled in the art will recognize the general functionality of the described messages and their applicability to other protocols. Further, the switch 14 is preferably configured to monitor states resulting from user interactions and provide corresponding state information to the presence system. For example, the interaction could be the user participating in a call or selecting a mode of operation, such as ring, meeting (off or vibrate), or actually participating in a call.

The flow begins when a user initially requests activation of the telephony device 16 through a local exchange carrier or like entity, which controls access and communications for the telephony device 16. Typically, the telephony device 16 is provisioned when provisioning information is sent from the provisioning database 18 to the switch 14 (step 400). The traditional provisioning information is supplemented with information indicating whether the user of telephony device 16 wishes to subscribe to the presence service provided by the presence system 20. Accordingly, the switch 14 will receive the provisioning information from the provisioning database 18 and provision the telephony device 16, as well as store information that correlates the relationship between the telephony device 16 and a presence ID, which is used by the presence system 20 for determining the state of the telephony device 16. The telephony device 16 is typically identified on the circuit-switched network 10 using a directory number, caller identification, or similar designation. Alternatively, a user may be able to dynamically provision a device from the device, without requiring the network operator to take action.

Once the provisioning of telephony device 16 is complete, the switch 14 will send a REGISTER message to the proxy server 28 (step 402). Preferably, the switch 14 registers as a user agent, and the proxy server 28 acts as a SIP proxy server. The REGISTER message effectively registers the ability of the switch 14 to provide presence information with the SIP proxy 28. In particular, the REGISTER message informs the proxy server 28 of the SIP URL that identifies the user agent of the switch 14 to the (SIP) packet-switched network 12. The REGISTER message may also contain information about how to reach the user agent over the packet-switched network 12, typically by providing the Internet Protocol (IP) address and port that the user agent will use for SIP sessions. Preferably, the REGISTER message will also include an initial state of the telephony device 16 and identification indicia for the telephony device 16. The identification indicia in a SIP environment is preferably a SIP ID, which is the logical address associated with the telephony device 16 as represented on the packet-switched network 12.

In response to this initial REGISTER message, the proxy server 28 will send a like REGISTER message to the registrar 26 to register the telephony device 16 with the registrar 26 (step 404). Further, the proxy server 28 may also forward the REGISTER message to the presence system 20 (step 406). At this point, the presence system 20 has registered the telephony device 16 and has associated an initial state with the telephony device 16. All other devices used to determine presence information of the user will register in the same or similar fashion.

The presence system 20 consolidates and/or transforms device data into the state associated with a logical or user identification and provides relevant state information to the presence application 24. Subsequently, the presence application 24 will subscribe to the presence service provided by the presence system 20 to receive presence state information based on state changes associated with the various devices of the user. Accordingly, the presence application 24 will send a SUBSCRIBE message, which includes identification information (SIP ID) of the user or telephony device 16, to the proxy server 28 (step 408), which will forward the SUBSCRIBE message to the presence system 20 (step 410). In response, the presence system 20 will use the SIP ID provided in the SUBSCRIBE message to identify the user or devices for which presence information is requested. Once the presence system 20 has evaluated the state of the telephony device 16, a NOTIFY message, including presence information for the user of the telephony device 16, is sent to the proxy server 28 (step 412), which forwards the NOTIFY message to the presence application 24 (step 414). At this point, the presence application 24 has subscribed to the presence service 20 for the user and has received the initial presence information for the user, and perhaps the state of the telephony device 16 and other devices, if so provisioned. Thus, the presence application 24 may react as necessary in response to receiving the presence information for the user and awaits state change notifications for the user.

Assume that the telephony device 16 changes state, such as being placed on-hook, going off-hook, initiating a hold function, going out of service, initiating a service activation, changing modes, or the like. In essence, any change of state may trigger an event, which is sent to the switch 14 in traditional fashion (step 416). In addition to normal processing of the event, the switch 14 will recognize that the telephony device 16 has been provisioned to alert the presence service of state changes, and will send a REGISTER message identifying the telephony device 16 (preferably using the SIP ID) and including the current state to the proxy server 28 (step 418), which represents the presence system 20 to the switch 14. The proxy server 28 will then send a REGISTER message to register the new state in association with the identified telephony device 16 with the presence system 20 (step 420). The presence system 20 will then process the state information to create the presence information for the user and send a NOTIFY message, if necessary, to the proxy server 28 to provide the updated presence information (step 422). The proxy server 28 will forward the NOTIFY message, which includes the presence information, to the presence application 24 (step 424), which can then take appropriate action based on the state information (step 426). As noted above, the state information may be associated with location information in an appropriately configured wireless communication system.

Those skilled in the art will recognize that the use of REGISTER messages is only one implementation. In general, the switch 14 or some other device that provides autonomous state change information can use a REGISTER message or some other undefined message to notify the presence service. If the presence system 20 subscribes to the information on the switch 14, which changes the role of the switch 14 to that of a presence user agent, it would allow the use of NOTIFY messages to communicate the presence data to the presence system 20.

The switch 14 may be configured to provide a table that correlates the identification of the telephony device 16 on the circuit-switched network 10 with a presence identity, which is preferably a SIP address or URL. Using this table, the switch 14 can identify state changes for the telephony device 16, process the changes based on the rules management logic 58, and send updated state information indirectly or directly to the presence system 20. For example, assume that a user has subscribed to an automatic presence service from a cellular communication operator. Part of the service subscription process will provision a presence address and correlate it with a registered mobile telephone 16B, based either upon the mobile identification number, a SIM card identification, the telephone number, or like designation.

Whenever the user's mobile telephone 16B is on and in reach of the mobile network, the home location register (HLR) is made aware of this fact as part of the normal course of cellular telephone operation. The HLR can register on-line status on behalf of the user's presence identification based on this information. As noted, the state information may include location identification in addition to traditional state information. Those skilled in the art will recognize the application of the present invention to both traditional time division multiplexing (TDM) switching systems and more recent innovations, such as IP public branch exchanges, or telephony clients, such as SIP user agents, H.323 endpoints, Microsoft NetMeeting, or real-time communication clients. Network resources, such as SIP proxies or H.323 gatekeepers, may also apply this technology if they retain call status information on the endpoints or user agents they manage.

Figure 7:
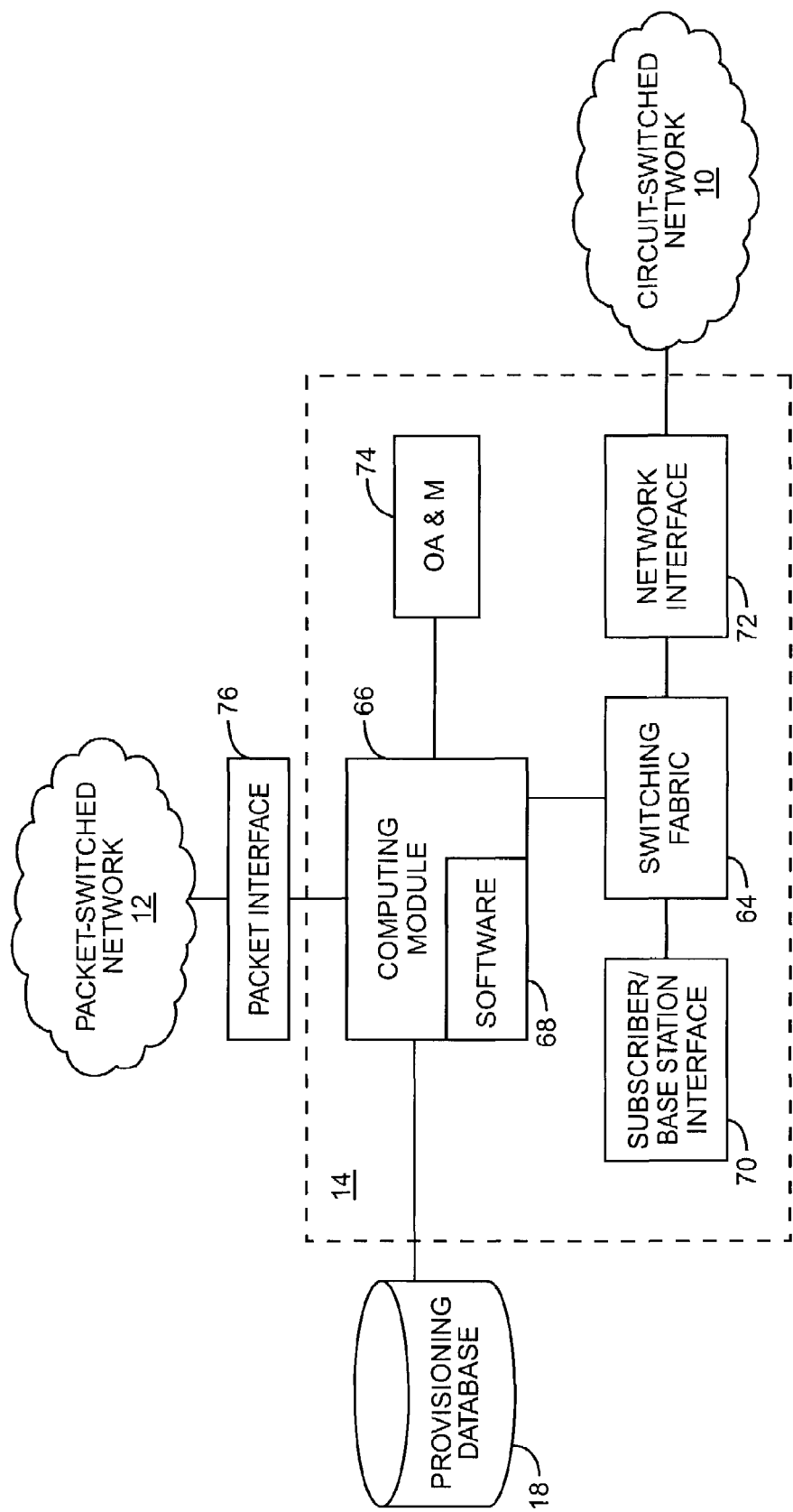
FIG. 7 is a block representation of a telephony switch constructed according to one embodiment of the present invention.

Turning now to FIG. 7, a block representation of a switch 14 is illustrated. The switch 14 is represented generically and is intended to cover the logical functionality of land-based and mobile switching systems, which include all control for call server-based functions. These switches may be implemented in a variety of ways using different equipment types, such as Nortel Networks Limited's DMS-100 local switching system. The switch 14 typically includes a switching fabric module 64, a computing module 66 including storage software 68, a subscriber/base station interface 70, a network interface 72, and an operations/administration and maintenance (OA & M) module 74. A packet interface 76 may be provided to facilitate communications with devices on the packet-switched network 12. The switching fabric 64 may comprise logical and physical switches for interconnecting the subscriber/base station interface 70 with the remainder of the circuit-switched network 10 through the network interface 72. Depending on a land-based or wireless embodiment, the subscriber/base station interface 70 will either directly support subscribers through subscriber lines or will support base stations, which facilitate wireless communications with mobile devices. As illustrated, the computing module 66 controls circuit-switched communications via the switching fabric 64 and is capable of providing traditional intelligent network monitoring and functions. Further, the computing module 66 may cooperate with the provisioning database 18 as described above. As noted above, the functionality of the switch 14 may be provided in various levels of integration.

In operation, the software 68 of the computing module 66 is modified to recognize state changes associated with supported telephony devices 16 and to provide the state information via the packet interface 76 either directly or indirectly to the presence system 20 on the packet-switched network 12. As noted, the messages sent to the presence system 20 will include identification of the associated telephony device 16, relative state information, and perhaps location information derived from a mobile telephone 16B or from elsewhere in the system. Preferably, the computing module 66 will cooperate with the provisioning database 18 to store information indicating that the particular telephony device 16 is subscribing to the presence service and providing an address for sending state change messages directly or indirectly to the presence system 20. The other devices providing state information are similarly configured to trigger delivery of state information upon recognizing the occurrence of an event caused by the natural interaction with the device.

Current presence technology standards and systems are provided for in references from the Internet Engineering Task Force (IETF). Presence technology protocol-related publications hereby incorporated by reference include: Day, M., Aggarwal, S. and Vincent, J., "Instant Messaging/Presence Protocol Requirements," Request for Comment (RFC) 2779, February 2000; Day, M., Rosenberg, J. and Sugano, H., "A Model for Presence and Instant Messaging," RFC 2778, February 2000; Rosenberg, J. and Schulzrinne, H., "SIP caller preferences and callee capabilities," November 2000; Crocker, D. et al., "A Common Profile for Instant Messaging (CPIM)," (work in progress), February 2001.

Figure 8:
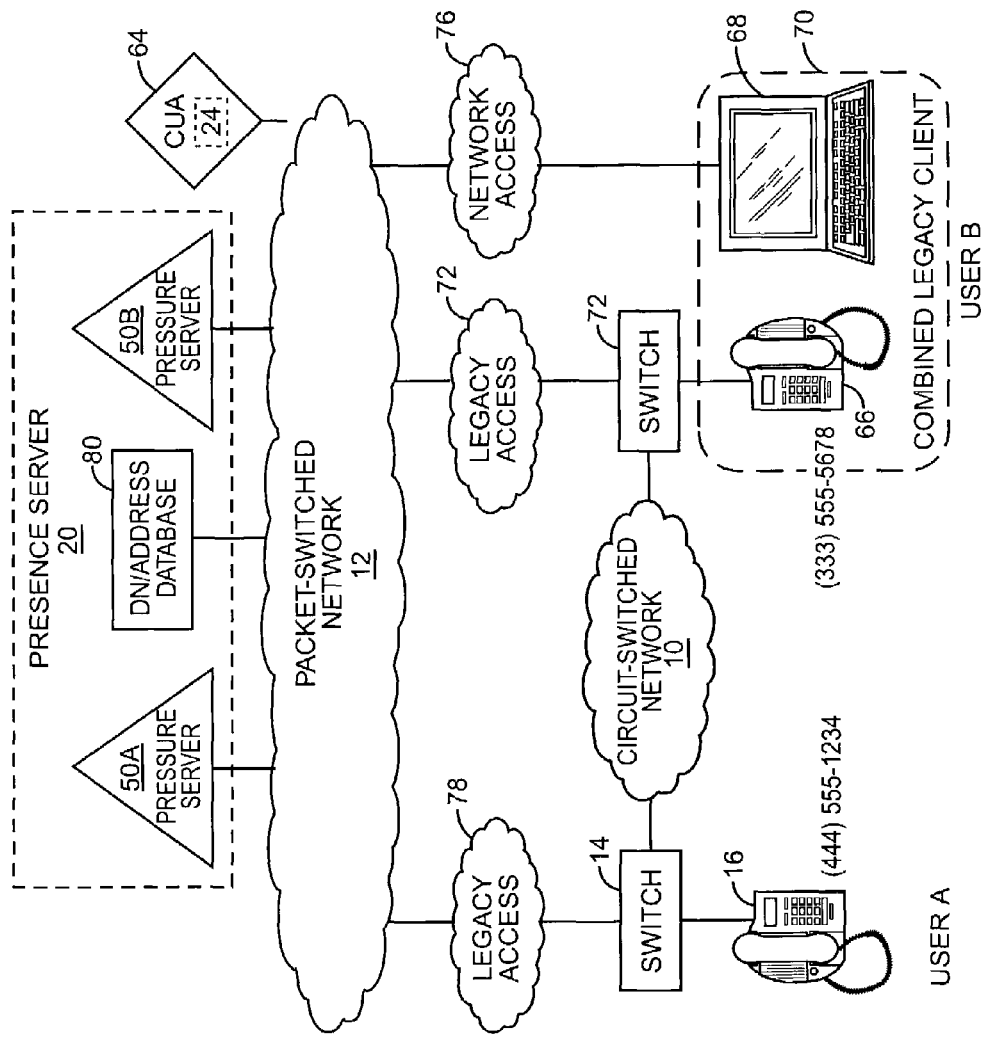
FIG. 8 is a communication environment according to a first embodiment of the present invention.

Turning now to FIG. 8, a communication environment according to one embodiment of the present invention is illustrated. In this embodiment, a combined user agent (CUA) 64 resides on the packet-switched network 12, and provides an association between a telephony device 66 and a computing device, such as a PC 68, both of which are associated with a given user to form what is referred to as a combined legacy client 70. The telephony device 66 is supported via a switch 72, which is analogous to any of the various switch embodiments described in association with switch 14 above. The switch 72 is preferably configured to cooperate with the CUA 64 via legacy access 74. The CUA 64 will typically cooperate with the PC 68 via network access 76 as illustrated. Accordingly, the CUA 64 can communicate with the switch 72 and receive information bearing on calls or activities associated with the telephony device 66, as well as interact with the PC 68 to receive and provide information, which may or may not be pertinent to the telephony device 66.

Telephony device 16 is associated with switch 14, which supports circuit-switched communications with switch 72 via the circuit-switched network 10. Those skilled in the art will recognize various ways to facilitate telephony calls, via circuit-switched or packet-switched means, between the switches 14 and 72. The switches 14 and 72 are each illustrated as supporting one telephony device; however, those skilled in the art will recognize that the switches will generally support large numbers of telephony devices. Further, the switches 14 and 72 may take the form of public branch exchange (PBX) switches or mobile (wireless) switches. In the latter case, the mobile telephony device would incorporate the functionality of the PC 68.

Switch 14 is provided access to devices on the packet-switched network 12 via legacy access 78. In the preferred embodiment, switch 14 is configured to provide state information to the presence system 20 as described above. The presence application 24 of CUA 64 is configured to subscribe to the presence system 20 to receive presence information pertaining to the user of telephony device 16. For the purposes of illustration, assume that the presence system 20 includes multiple presence servers 50A, 50B and a directory number (DN) or address database 80, which keeps track of the various presence participants and the presence servers 50A, 50B serving those participants. Further assume that presence server 50A monitors state information of User A and provides presence information for User A, who is associated with telephony device 16, and presence server 50B provides presence services for User B, who is associated with the combined legacy client 70. Notably, users A and B may be associated with many other devices, and only the select devices illustrated are described to facilitate a clear and concise understanding of the concepts of the present invention.

Figure 9A:
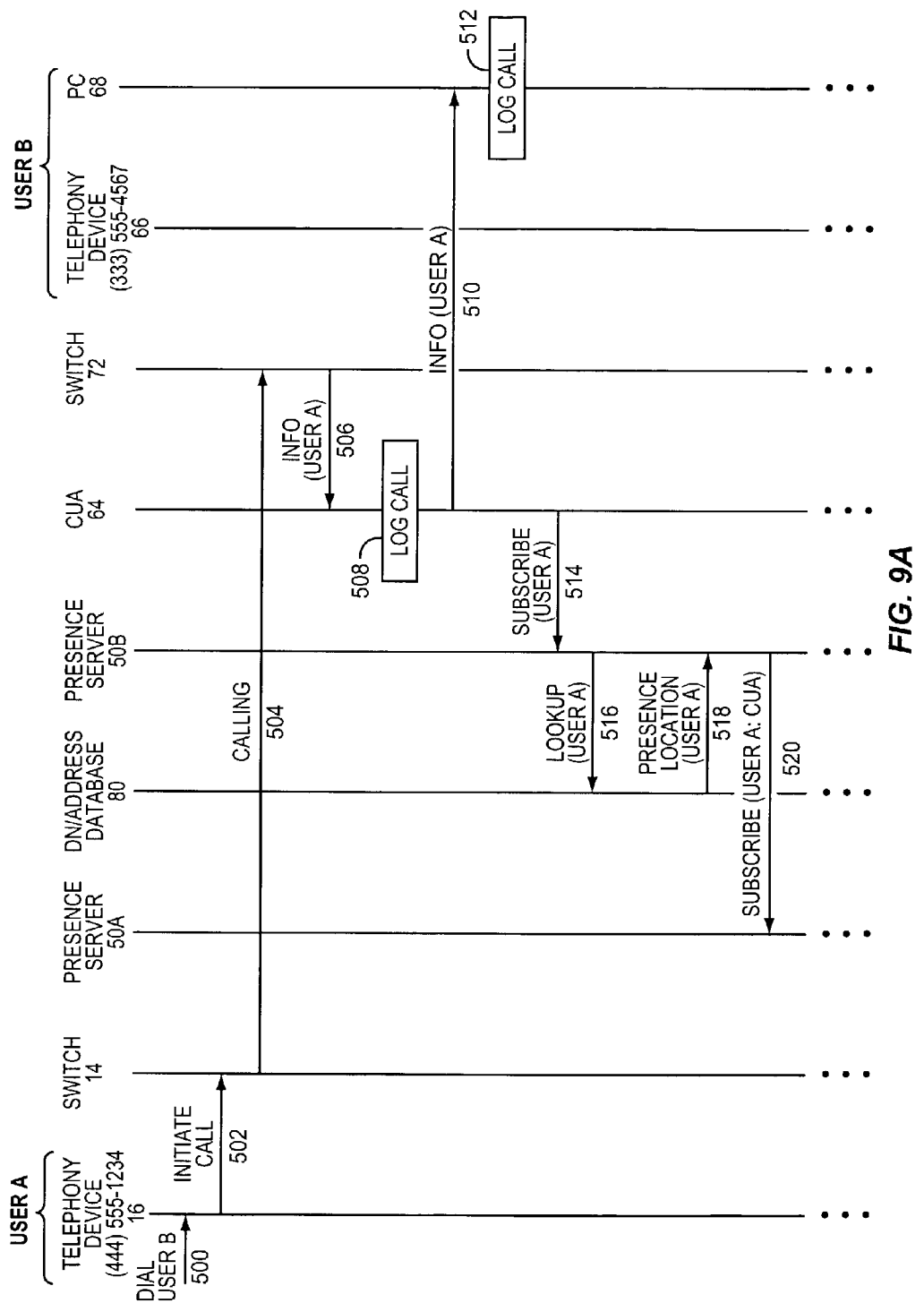
FIGS. 9A and 9B are a communication flow diagram illustrating operation of one embodiment of the present invention.
Figure 9B:
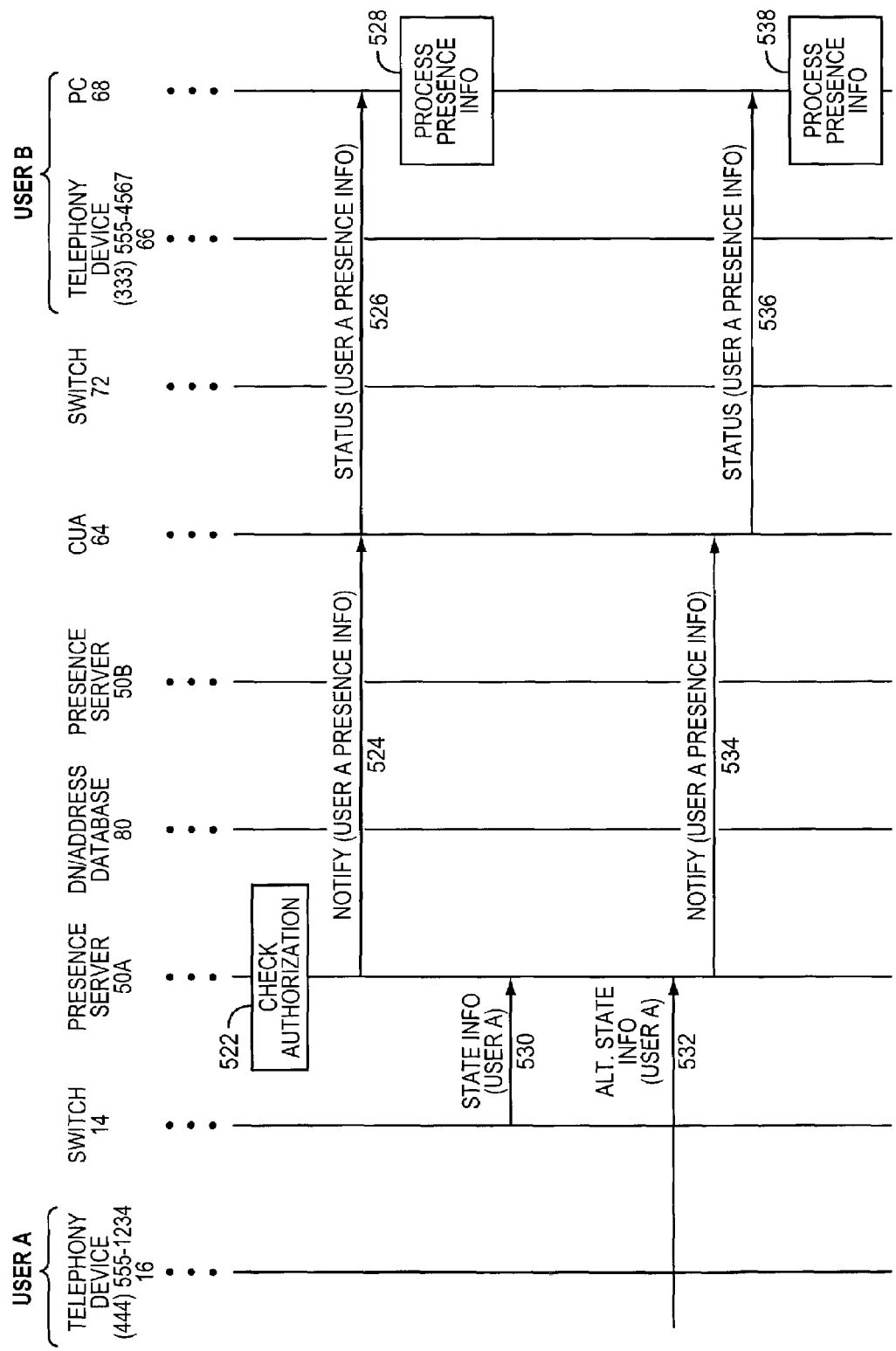

With reference to FIGS. 9A and 9B, assume that User A makes a call from telephony device 16 to User B at telephony device 66, and the call is either unanswered or directed to voicemail due to User B being unavailable or on the telephone. Further assume that the presence application 24 running in the CUA 64 has been configured to obtain presence information for incoming and outgoing calls appearing on a call log, which is kept at the CUA 64, switch 72, telephony device 66, or PC 68. If the call log is not kept at the CUA 64, the CUA 64 will communicate with switch 72, telephony device 66, or the PC 68, as the case may be, to obtain incoming or outgoing call information and maintain the call log. If the call log is maintained in the PC 68, the CUA 64 may facilitate communications with switch 72 to obtain the necessary calling information to maintain the call log. For this example, assume that the call log is kept at the CUA 64, and that incoming or outgoing calling activity associated with telephony device 66 is provided to the CUA 64 by switch 72 in legacy access 74 in an automated fashion.

The call flow of FIGS. 9A and 9B begins when User A initiates a call to telephony device 66 of User B by dialing the directory number associated with telephony device 66 (step 500). Telephony device 16 of User A will initiate the call by sending the dialed digits to the associated switch 14 (step 502), which will attempt to establish the call with telephony device 66 via switch 72 (step 504).

Regardless of whether the call is answered, directed to voicemail, or goes unanswered, switch 72 is preferably configured to recognize a call directed to telephony device 66 and send an information message to the CUA 64 indicating that a call initiated from directory number 444-555-1234 is being attempted to telephony device 66, which has a directory number 333-555-5678 (step 506). The CUA 64 will log the call (step 508). If the PC 68 were keeping the call log, the information relating to the incoming call would be forwarded from the CUA 64 to the PC 68 (step 510), where the call would be logged (step 512).

Upon identifying an incoming call for telephony device 66 of User B, the CUA 64 will send a SUBSCRIBE message to the associated presence server 50B providing information identifying User A (step 514). Typically, the information may simply be the directory number or other address information for telephony device 16. The presence server 50B will receive the SUBSCRIBE message and first determine whether it services User A, wherein servicing indicates monitoring state information for devices associated with User A and providing presence information to devices subscribing to presence information associated with User A. Assume in this case that presence server 50B does not service User A or devices associated therewith. As such, presence server 50B will access a directory number or address database 80 to determine a presence server that does support User A (step 516). Preferably, the LOOKUP message may be any type of message capable of identifying a servicing presence server for User A, and in this example will include the directory number for telephony device 16 of User A. In response, the directory number or address database 80 will provide information bearing on the location of the presence server servicing User A (step 518). In this example, presence server 50A is the presence server servicing User A and is capable of monitoring state information provided by switch 14 in response to activity surrounding telephony device 16. Presence server 50A may also monitor state information for any number of other devices associated with User A, and provide presence information for User A as described above.

Once presence server 50B has identified presence server 50A as the servicing presence server for User A, presence server 50B will send a SUBSCRIBE message to presence server 50A effectively identifying User A or telephony device 16 associated therewith, and request that presence information pertaining to User A be sent to the CUA 64 (step 520). Those skilled in the art will recognize that the SUBSCRIBE message may contain any type of information capable of being processed by presence server 50A to provide presence information bearing on User A directly to the CUA 64 or indirectly to the CUA 64 via presence server 50B or other proxies. Upon receiving the SUBSCRIBE message, presence server 50A will check to see if User A has authorized User B to receive presence information, in general or at the level requested, depending on the security level provided by presence server 50 for User A (step 522). Another useful configuration is to limit CUA 64 to request presence information only for calls made to user B. Users calling User B are probably willing to relinquish some privacy, letting others know when they are on or off the phone, in the interest of being able to talk to User B whom they just tried to reach. Several other authorization schemes are possible including: User A limiting the subscription of presence information to a fixed interval (e.g. one hour, one day) after the initial call was made, User A canceling the subscription for User B after a call is received from User B and is successfully answered by User A, User A authorizing only the last N users who called, User A authorizing only users who were previously called by User A, User A authorizing only users who have called User A, User A blocking authorization for specific calls by dialing, before or after a call, a special code on their telephone (e.g. *67), disabling all prior subscription using a special code (e.g. *232), or any combination of above options and others. The selection of which options are active can be done in multiple ways, including via a call to an operator, an interactive voice response system, or a web site.

Presence server 50A may be configured to immediately provide presence information to the CUA 64, or may wait for a set period of time or until a state change occurs. If presence information is immediately sent upon receiving the SUBSCRIBE message, presence server 50A will send a NOTIFY message providing presence information for User A to the CUA 64 (step 524), which will send a STATUS message providing the presence information for User A to the PC 68 (step 526). In response, the PC 68 will process the presence information (step 528). Processing may be providing a message or other notification sufficient to communicate the availability of User A to User B.

After a period of time, assume that switch 14 detects that telephony device 16 is on-hook, which indicates that User A is not participating in a call via telephony device 16 and is available to receive a call. As such, switch 14 can send state information pertaining to User A to the associated presence server 50A (step 530). Server 50A can, in addition to relaying onhook/offhook status changes, declare an idle status if the phone has not been active for a programmable amount of time, for example 5 minutes. Further, any other devices providing state information for User A may also periodically send state information to presence server 50A (step 532). Presence server 50A will monitor incoming state information, and based on the configuration, will provide presence information for User A to the CUA 64 (step 534), which will send a status message including the presence information for User A to the PC 68 (step 536). The PC 68 will process the presence information (step 538) and provide the proper notification to User B.

In its simplest form, the present invention allows basic state information regarding whether User A is on or off the telephone to be sent to the CUA 64 in response to the CUA 64 identifying an incoming call from telephony device 16. The CUA 64 will process the presence information, which may be simply the raw state information indicating whether telephony device 16 is on- or off-hook, and provide that information to the PC 68 to alert User B of the availability of User A to receive a call. Preferably, a change in state of telephony device 16 triggers the delivery of state information to the CUA 64, and thus, a notification to User B that User A is off the telephone. At this point, User B can place a call to telephony device 16 of User A with relative assurance that User A is not on the telephone.

More complicated embodiments may have presence server 50A monitor state information from various devices and provide presence information indicating the best way to contact User A. As such, the CUA 64 will provide such information to the PC 68 to inform User B of the best way to communicate with User A, and potentially the best time to communicate with User A. Further, although the above example focuses on providing presence information associated with an incoming call, such presence information may be subscribed to for outgoing calls, calls that were not answered, went to voicemail, or any combination thereof. The invention is readily applicable to wireless and packet-switched environments.

The use of a CUA 64 to provide an association between a telephony device 66 and a PC 68 allows a significant amount of configurability and interplay between these devices. For example, notifications of the availability of User A may trigger an alert via the telephony device 66, as well as having the CUA 64 cooperate with switch 72 to automatically initiate a call from telephony device 66 of User B to telephony device 16, or any other device of User A, upon User A becoming available.

Further, the call log for incoming and outgoing calls may be configured in any manner, and the retrieval of presence information for the incoming or outgoing calls may also be configured in any number of ways. For example, presence information may be provided only for the most recent incoming or outgoing calls, which include attempted or completed calls, or for a set number of the incoming or outgoing calls. Further, the call log and associated presence information may be ported to other applications or programs containing a contact list, such as a buddy list for instant messaging. If the call log is transferred to the instant messaging application, the instant messaging application may actually subscribe to the CUA 64 or presence server 50A, 50B directly. Notably, the call logs managed by the CUA 64 may include calls to and from numerous switches 14 and users as well as other users on switch 72.

Those skilled in the art will recognize that the switches represented by switches 14 and 72 may be configured to support packet-switched, circuit-switched, and wireless communication, and may cooperate with or include gateways to facilitate transitioning between any of these types of communications. Further, the combined legacy client 70, which is illustrated as having a separate telephony device 66 and PC 68, may take many forms, which may include separate devices as shown, or may be integrated to various degrees. For example, the telephony device 66 may include sufficient hardware and software to receive the presence information directly from the CUA 64 and provide them to User B. Likewise, the PC 68 may include telephony capabilities, and thus be able to handle calls as well as communicate with the CUA 64.

In yet another embodiment, the CUA 64 may function as a multifunctional call processing agent that is able to control packet-based multimedia sessions, as well as control call signaling, in a traditional telephony switch 72 for the telephony device 66 and an associated multimedia device, such as the PC 68. The CUA 64 can effectively establish multimedia sessions with the multimedia device and voice calls with the telephone. For more information pertaining to use of the CUA 64 and the mechanism to blend voice and multimedia sessions, attention is directed to U.S. application Ser. No. 10/028,510 filed Dec. 20, 2001, entitled COMBINING MULTIMEDIA SERVICES WITH TRADITIONAL TELEPHONY, which is incorporated herein by reference in its entirety. For additional information pertaining to presence systems, attention is directed to U.S. application Ser. No. 10/079,237 filed Feb. 20, 2002, entitled TELEPHONY USAGE DERIVED PRESENCE INFORMATION and U.S. application Ser. No. 10/100,703 filed Mar. 19, 2002, entitled MONITORING NATURAL INTERACTION FOR PRESENCE DETECTION, which are incorporated herein by reference in their entireties.

Figure 10:
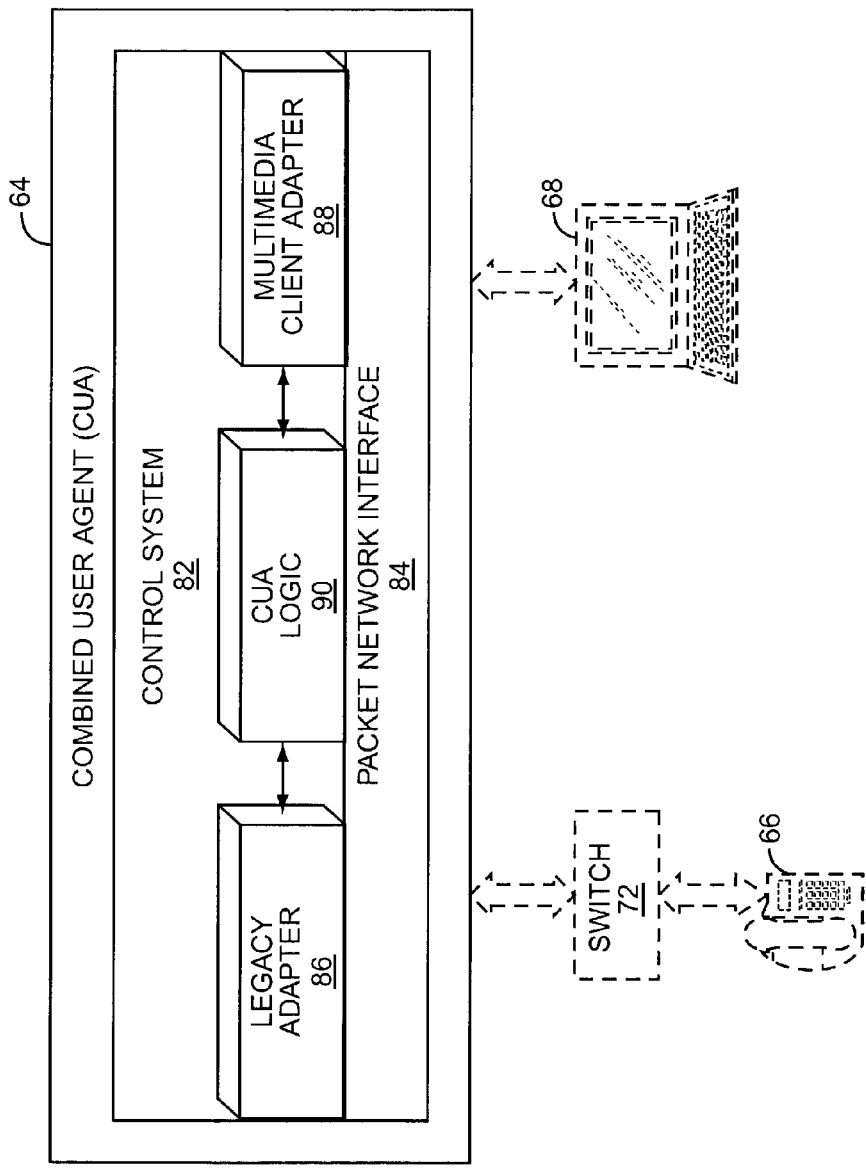
FIG. 10 is a block representation of a combined user agent according to one embodiment of the present invention.

As illustrated in FIG. 10, the combined user agent 64 is preferably implemented in a control system 82 associated with a packet network interface 84 for communicating over the packet network 12. The control system 82 will support software applications providing a legacy adapter 86, a multimedia client adapter 88, and the basic CUA logic 90. The legacy adapter 86 will provide the necessary protocol adaptation and call signaling control necessary to interact with and control the telephony switch 72. The multimedia client adapter 88 is used to support sessions with the associated PC 68 or like multimedia device. The multimedia client adapter 88 may provide protocol adaptation as necessary to establish the media sessions or a SIP implementation, wherein when the PC 68 emulates a SIP client, the CUA logic 90 may represent the multimedia capabilities of the PC 68 for the non-voice media sessions. The CUA logic 90 will also cooperate with the legacy adapter 86 to receive notifications of incoming or outgoing calls and provide any necessary call signaling for the telephony switch 72 to control voice communications with the telephone 66. Accordingly, the CUA logic 90 cooperates with the legacy adapter 86 and the multimedia client adapter 88 to provide an interface to the PC 68 as well as an interface to the telephony switch 72.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   a) receiving call information bearing on a first call involving first and second users, wherein the call information bearing on the first call triggers a request to subscribe the second user to a presence information server associated with the first user;
   b) requesting presence information associated with the first user and bearing on the availability of the first user to participate in a second communication based on the call information;
   c) receiving the presence information; and
   d) effecting delivery of the presence information to the second user.

2. The method of claim 1 wherein the first call is initiated at a first telephony device by the first user and directed to a second telephony device associated with the second user.

3. The method of claim 1 wherein the call information is indicative of an identity of the first user or a telephony device associated with first user.

4. The method of claim 3 wherein the call information comprises a directory number or address for the telephony device associated with the first user.

5. The method of claim 1 wherein the delivery of the presence information to the second user is effected by sending the presence information to a computing device of the second user.

6. The method of claim 5 wherein the computing device is associated with a telephony device of the second user and the telephony device of the second user is associated with the first call.

7. The method of claim 1 wherein the delivery of the presence information to the second user is effected by sending the presence information to a telephony device of the second user, the telephony device involved in the first call.

8. The method of claim 1 wherein the delivery of the presence information to the second user is effected when the first user is available to receive a call.

9. The method of claim 1 wherein the delivery of the presence information to the second user is effected when the first user is available to receive a call at a telephony device associated with the first user, the telephony device involved in the first call.

10. The method of claim 1 further comprising initiating a second call to a first device associated with the first user from a second device associated with the second user.

11. The method of claim 1 further comprising initiating a second call to a first device associated with the first user from a second device associated with the second user when the first device becomes available for a call to the first user.

12. The method of claim 1 wherein said presence information is provided for users associated with a plurality of calls involving the second user.

13. The method of claim 12 further comprising:
   e) requesting the presence information for the users associated with at least two of the plurality of calls in a call log;
   f) receiving the presence information for the users associated with the at least two of the plurality of calls; and
   g) effecting delivery of the presence information to the second user.

14. The method of claim 13 further comprising transferring the call log to an application, which requests the presence information for the first user.

15. The method of claim 1 wherein the presence information bears on a state of a telephony device associated with the first user.

16. The method of claim 1 wherein the presence information bears on a state of a telephony device and a state of at least one other device associated with the first user.

17. The method of claim 1 wherein the call information is received from a telephony switch.

18. The method of claim 1 wherein the second communication is a telephony call.

19. The method of claim 1 wherein the presence information identifies a communication method other than a method used for the first call to contact the first user to effect the second communication.

20. The method of claim 1 wherein the presence information is delivered to the second user only within a defined time after the first call.

21. The method of claim 1 wherein the presence information is not sent after the second communication is effected between the first and second users.

22. The method of claim 1 wherein the presence information is sent to the second user only if the second user has called the first user prior to the first call.

23. The method of claim 1 wherein the presence information is sent to the second user only if the second user is one of the last N callers to the first user.

24. The method of claim 1 wherein the presence information is not sent to the second first user if the first user sends a request not to deliver the presence information.

25. A system comprising an interface and a control system associated with the interface and adapted to:
   a) receive call information bearing on a first call involving first and second users, wherein users use the call information bearing on the first call triggers a request to subscribe the second user to a presence information server associated with the first user;
   b) request presence information associated with the first user and bearing on the availability of the first user to participate in a second communication based on the call information;
   c) receive the presence information; and
   d) effect delivery of the presence information to the second user.

26. The system of claim 25 wherein the first call is initiated at a first telephony device by the first user and directed to a second telephony device associated with the second user.

27. The system of claim 25 wherein the call information is indicative of an identity of the first user or a telephony device associated with first user.

28. The system of claim 25 wherein the call information comprises a directory number or address for the telephony device associated with the first user.

29. The system of claim 25 wherein the control system is adapted to effect delivery of the presence information to the second user by sending the presence information to a computing device of the second user.

30. The system of claim 29 wherein the computing device is associated with a telephony device of the second user and the telephony device of the second user is associated with the first call.

31. The system of claim 25 wherein the control system is adapted to effect delivery of the presence information to the second user by sending the presence information to a telephony device of the second user, the telephony device involved in the first call.

32. The system of claim 25 wherein the delivery of the presence information to the second user is effected when the first user is available to receive a call.

33. The system of claim 25 wherein the delivery of the presence information to the second user is effected when the first user is available to receive a call at a telephony device associated with the first user, the telephony device involved in the first call.

34. The system of claim 25 further comprising initiating a second call to a first device associated with the first user from a second device associated with the second user when the first device becomes available for a call to the first user.

35. The system of claim 25 wherein the control system is further adapted to initiate a second call to a first device associated with the first user from a second device associated with the second user.

36. The system of claim 25 wherein said presence information is provided for users associated with a plurality of calls involving the second user.

37. The system of claim 36 wherein the control system is further adapted to:
   e) request the presence information for the users associated with at least two of the plurality of calls in a call log;
   f) receive the presence information for the users associated with the at least two of the plurality of calls; and
   g) effect delivery of the presence information to the second user.

38. The system of claim 37 wherein the control system is further adapted to transfer the call log to an application, which requests the presence information for the first user.

39. The system of claim 25 wherein the presence information bears on a state of a telephony device associated with the first user.

40. The system of claim 25 wherein the presence information bears on a state of a telephony device and a state of at least one other device associated with the first user.

41. The system at claim 25 wherein the call information is received from a telephony switch.

42. A system comprising:
   a) means for receiving call information bearing on a first call involving first and second users, wherein
   b) means for using the call information bearing on the first call triggers a request to subscribe the second user to a presence information server associated with the first user subsequent to the first call;
   b) means for requesting presence information associated with the first user and bearing on the availability of the first user to participate in a second communication based on the call information;
   c) means for receiving the presence information; and
   d) means for effecting delivery of the presence information to the second user.

* * * * *